(12) United States Patent
Su

(10) Patent No.: US 8,917,802 B1
(45) Date of Patent: Dec. 23, 2014

(54) MODULATION SCHEME DETERMINATION THROUGH USE OF MULTIPLE SENSORS

(71) Applicant: The United States of America, as represented by the Secretary of the Army, Washington, DC (US)

(72) Inventor: Wei Su, Bel Air, MD (US)

(73) Assignee: The United States of America, as represented by the Secretary of the Army, Washington, DC (US)

(*) Notice: Subject to any disclaimer, the term of this patent is extended or adjusted under 35 U.S.C. 154(b) by 130 days.

(21) Appl. No.: 13/771,869

(22) Filed: Feb. 20, 2013

(51) Int. Cl.
*H04B 1/10* (2006.01)
*H04L 27/00* (2006.01)

(52) U.S. Cl.
CPC .................................. *H04L 27/0012* (2013.01)
USPC ............................ 375/343; 375/347; 375/349

(58) Field of Classification Search
USPC .................. 375/340, 343, 346, 347, 349, 350
See application file for complete search history.

(56) References Cited

U.S. PATENT DOCUMENTS

| | | | |
|---|---|---|---|
| 7,139,221 B1* | 11/2006 | Carter et al. .................. | 367/125 |
| 7,421,261 B2* | 9/2008 | Sahlin et al. .................. | 455/135 |
| 2006/0072679 A1* | 4/2006 | Chen et al. .................... | 375/261 |

* cited by examiner

*Primary Examiner* — David B. Lugo
(74) *Attorney, Agent, or Firm* — Azza Jayaprakash

(57) ABSTRACT

Various embodiments associated with multiple signal editions is described. A plurality of sensors can be deployed in an environment. These sensors can be used to capture a signal of interest (SOI). However, when the signal is weak or difficult to sense, what an individual sensor captures may be of little value. Therefore, multiple sensors can be used together to capture the signal (e.g., different editions of the SOI). Further, it is possible that the demodulation scheme of the signal is not known, such as when the signal is from an unknown network (e.g., a network of an enemy). A mathematical operation can be performed upon signal editions such that a result does not include noise. This result can be used in determining the demodulation scheme of the signal.

20 Claims, 19 Drawing Sheets

US 8,917,802 B1

MODULATION SCHEME DETERMINATION THROUGH USE OF MULTIPLE SENSORS

GOVERNMENT INTEREST

The innovation described herein may be manufactured, used, imported, sold, and licensed by or for the Government of the United States of America without the payment of any royalty thereon or therefor.

BACKGROUND

In a combat environment, different forces can broadcast different signals. In a singular environment, enemy combatants can each broadcast different signals. It may be possible for one combatant to intercept the signal of another combatant. The intercepting combatant may not know the modulation scheme of an intercepted signal. Without the modulation scheme, it may be difficult to put the intercepted signal to use.

SUMMARY

A system comprising a processor and a non-transitory computer-readable medium is described. The non-transitory computer-readable medium is communicatively coupled to the processor and stores computer executable components to facilitate operation of components. The components comprise a calculation component configured to perform a mathematical operation upon a first signal edition and a second signal edition to produce a mathematical result, where performance of the mathematical operation eliminates uncorrelated noise of the first signal edition and the second signal edition through correlation of the first signal edition and the second signal edition, where the first signal edition and the second signal edition are different editions of a signal, where the first signal edition is collected by a first sensor, where the second signal edition is collected by a second sensor, and where the first sensor and second sensor are different sensors. The components also comprise a determination component configured to make a determination on a modulation scheme for the signal based, at least in part, on the mathematical result, where the modulation scheme is employed to demodulate the signal.

In addition, a system comprising a determination component, a demodulation component, and a processor is described. The determination component makes a determination on a modulation scheme of a signal based, at least in part, on a mathematical result derived from performance of a mathematical operation upon the signal, where the signal is obtained from a first receiver and a second receiver and where performance of the mathematical operation produces the mathematical result such that the mathematical result is void of noise. The demodulation component demodulates the signal through use of the modulation scheme, where the signal after demodulation is outputted. The processor executes at least one instruction associated with the determination component or the demodulation component.

Further, a non-transitory computer-readable medium configured to store computer-executable instructions that when executed by a processor cause the processor to perform a method is described. The method comprises calculating a moment for a first signal edition and a second signal edition, where the moment is calculated through use of a product from multiplying at least a first edition of a signal with a second edition of the signal, where the first edition of the signal is collected by a first sensor, where the second edition of the signal is collected by a second sensor, where the first sensor and the second sensor are different sensors, and where the first edition of the signal and the second edition of the signal are non-identical when collected. The method also comprises identifying a constellation of the signal through use of the moment, matching the constellation of the signal with a constellation of a known signal, establishing a modulation scheme associated with the known signal, and using the modulation scheme associated with the known signal to demodulate the signal.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Various sensors (e.g., low-cost sensors) can be used in distributed locations for sensing and classifying weak signals. Automatic modulation classification (AMC) of communication signals is applicable for military applications, cognitive radio applications, etc. The concept of AMC is to classify an unknown modulation scheme by comparing it to hypothetical schemes. Use of higher-order statistics (HOS) is a technique that can be employed in AMC. However, the conventional HOS AMC uses knowledge of the noise power. Thus, it can be beneficial to generate HOS using distributed signal copies so that the noises at distributed sensors are eliminated in HOS calculation to obtain robust features for reliable signal exploitation.

Dynamic spectrum access, adaptive modulation, and low-power transmission can be desired capabilities of cognitive radios which can freely hop through available spectrum and nodes, modify transmission characteristics and waveforms, and exploit opportunities of using the spectrum and power effectively. Sensing the agile signal of interest (SOI) in a dynamic environment with unpredictable adaptations and low transmitting power can occur.

In a non-cooperative communication environment (e.g., no handshaking between transmitters and receivers), a transmitting signal and communication channels are usually not favorable to an ad-hoc receiver or sensing unit and the received signal at the sensor could be weak and distorted so that signal sensing and classification becomes extremely difficult and unreliable. This can be less than ideal in a military, police, or other environment where the communication channels are for an enemy force (e.g., hostage takers) while the ad-hoc receiver is of a friendly force (e.g., police force).

To address the sensing and classification bottleneck, a sensor network can be evaluated. A network centric framework should build interfaces for connecting distributed devices as well as search for unknown dimensions for new capabilities. Two approaches that can be used are the fusion of local signal decisions and the central decision of the fused signals. The former can use expensive distributed processors to make decisions locally and the latter combines multiple signal copies from less-expensive sensors to make a central decision. A central decision modulation classification method can be used based on HOS of distributed signal copies which gives more robust and accurate estimation and classification of SOI comparing with the performance using an individual signal copy alone.

Figure 1:
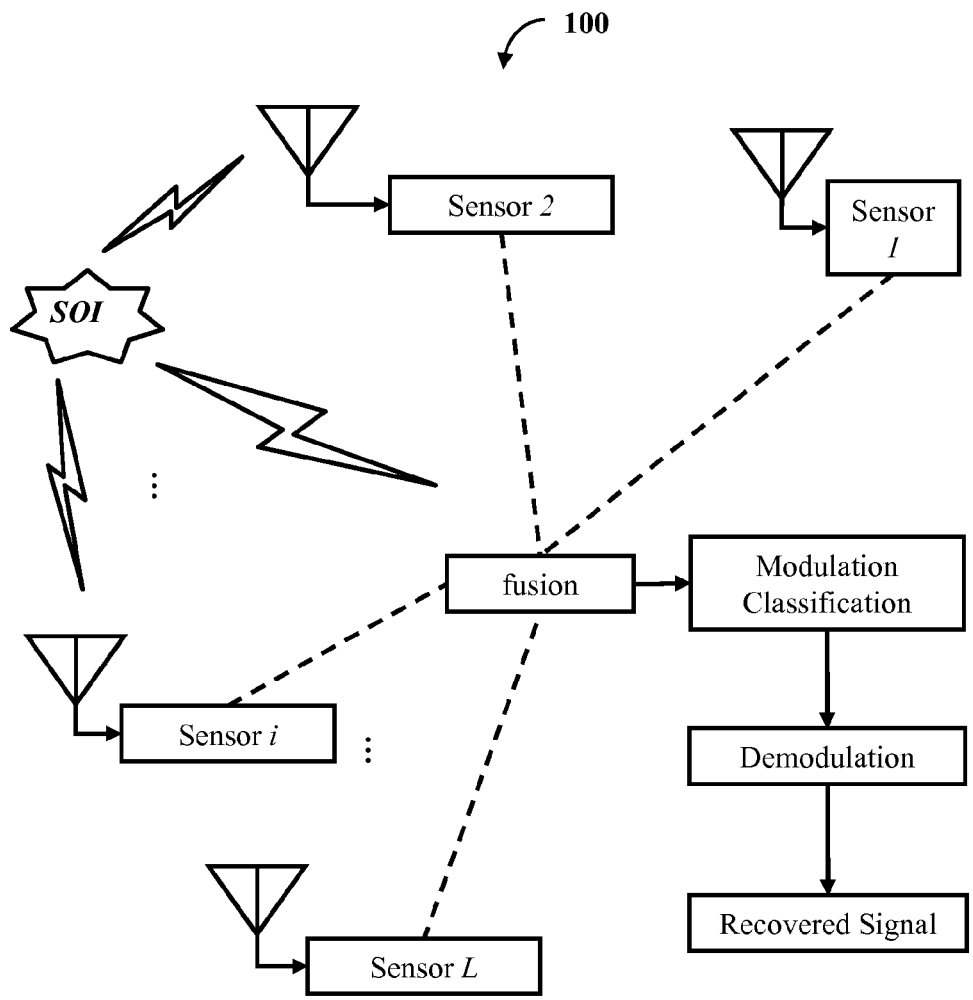
FIG. 1 illustrates one embodiment of a system with antennas, multiple sensors, a fusion module, a modulation module, a demodulation module, and a recovered signal module.

FIG. 1 illustrates one embodiment of a system 100 with antennas, multiple sensors, a fusion module, a modulation module, a demodulation module, and a recovered signal module. The system 100 illustrates the concept of a central decision based distributed signal sensing and modulation classification. The system 100 can use simple, inexpensive, low-maintenance, and asynchronous sensors so sensing devices can be deployed to cover a wide-spread geographical area seamlessly and multiple narrow-band receivers can be collaborated to handle a wide frequency band effectively. The distributed sensors can be clustered and orchestrated by a fusion center that includes a processor. A user can deploy massive amounts of very low-cost and disposable sensors to cover remote, inaccessible, hostile and dangerous regions. In addition, a user can leverage existing infrastructure such as heterogeneous conventional or cognitive radios, Wi-Fi devices, phones, or mesh networks by contributing limited or partial operation for signal sensing (as a secondary function) under a service agreement without affecting primary function of such devices. Interfaces of the sensors can be pushed towards antennas where the burden of extra signal processing is absorbed by the fusion center and the sensors merely relay the raw data. Operational decisions can be made and executed at the fusion center which avoids demodulating signals at distributed locations and simplifies the security and operational constraints. This approach also makes applications and system upgrades independent to the distributed sensors.

The fusion center may be located at the same location as a sensor. The fusion center can send periodic requests to L distributed sensors, $R_1, R_2, \ldots,$ and $R_L$ to acquire a weak SOI. Upon the reception of the request, the distributed sensors take short time duration snapshots of the SOI. The distributed sensors can provide very limited signal processing capabilities such as RF reception and transmission, frequency tuning, filtering, and digitization. Thus, sensors may be asynchronous and non-cooperative to one another and are used for communicating with, or relaying distributed snapshots to, the fusion center. Snapshots are very short and are taken periodically and therefore there can be ample time between any two snapshots for signal processing and analysis. This operation can be conducted in real-time.

Approaches for central decision signal sensing and classification can use and/or be based on multiple-antenna based modulation classification and use synchronous sensors for coherent signal combining. However, practically, the distributed signal copies will likely not be perfectly synchronous due to the unknown channels and Doppler effect between the SOI and the distributed sensors. In an asynchronous sensor scenario, magnitudes, phases, frequencies, and clocks among sensors can be different. Consequently, there exist the relative phase offset (RPO) induced by different Local Oscillators (LOs), channels and filters, relative time offset (RTO) induced by different propagation paths and sampling clocks, and the relative frequency offset (RFO) induced by different LOs and the Doppler effect before combining the signal copies coherently. The fusion center can be designed to have adequate signal processing power and time to estimate, analyze, and process data delivered by various sensors to generate an enhanced signal for detection, classification and blind demodulation.

If the sensors are dumb sensors, then the sensors can be configured to not make local decisions but store short snapshots, $r_i(t)$, $i=2, 3, \ldots, L$, as time-stamped data packets and forward them to the fusion center for processing. The packets can be transmitted to the fusion center using a communication method. Without loss of generality, $R_1$ is assumed to be the reference sensor, $R_2, R_3, \ldots,$ and $R_L$ are compared to $R_1$ for the relative magnitude, time, frequency, and phase offsets. It can be assumed in this dumb sensor example that the channels have no noticeable change within a very short observation time period $T_0$. The signal packets received at the fusion center can be described as $$r_i(t) = \Delta\alpha_i e^{j(\Delta\omega_i t + \Delta\beta_i)} s(t+\Delta\tau_i) + n_i(t) \quad (1)$$

where $i=1, 2, \ldots, L$; $\Delta\omega_i$ and $\Delta\tau_i$ are RFO and RTO, respectively, $\Delta\alpha_i$ and $\Delta\beta_i$, $\Delta\alpha_1=1$ and $\Delta\beta_1=0$, are the relative magnitude offset (RMO) and RPO which aspects disclosed herein can be practiced without knowing, and $n_i \sim N(0,\sigma_i)$, $i=1, 2, \ldots, L$ is i.i.d. circularly symmetric complex additive white Gaussian noise (AWGN). Relative offsets are referring to $$r_1(t) = s(t) + n_1(t) \quad (2)$$

where $$s(t) = a_0 s_0(t) e^{j(\omega_0 t + \beta_0)} \quad (3)$$

is the frequency down-converted copy of the SOI observed at $r_1$, $a_0$, $\omega_0$, and $\beta_0$ are gain, frequency, and phase between the transmitter and the sensor $R_1$, respectively, $$s_0(t) = \sum_{n=0}^{N-1} g(n)P(t - nT - \lambda T) + v(t) \quad (4)$$

is the SOL g(n) is the information symbol, n=1, 2, . . . , N. P represents the signal pulse, and $\lambda T$ is the time delay with $0<\lambda<1$.

When using simple sensors, the offsets among sensors may not be able to be estimated locally and the sensors in the network may not be synchronous. The fusion center collects asynchronous signal copies and compensates them using a post-synchronization method. After $\Delta\omega_i$ and $\Delta\tau_i$ are estimated and removed, the signals can be down converted to $$x_i(n) = \Delta\alpha_i a_0 e^{j(\beta_0 + \Delta\beta_i)} g(n) + w_i(n) \quad (5)$$

where $w_i(n)$ is the down-converted AWGN.

The HOS used in the existing AMC approaches include moments, cyclic-moments, cumulants, and cyclic cumulants. The $n^{th}$ order moments of a single signal copy $x_i$ is defined as $$m_{p,q}(x_i) = \sum_{n=1}^{N} x_i(n)^{p-q}[x_i(n)^*]^q$$

where $p>0$ is an even integer, $0 \leq q \leq p/2$ is an integer and '*' denotes the complex conjugate operation. Moments for L even number of distributed signal editions (the sequence order of the editions are not important): $x_1(n)$, $x_2(n)$, . . . , $x_L(n)$, is defined by:

$$m_{p,q}(x_1, x_2, \ldots, x_L) = \sum_{n=1}^{N}\left[\prod_{i=1}^{p-q} x_i(n) \prod_{i=p-q+1}^{p} x_i^*(n)\right], \quad (6)$$

$$= a_0^p \prod_{i=1}^{p-q} \Delta\alpha_i e^{j[\sum_{i=1}^{p-q}\Delta\beta_i - \sum_{p-q+1}^{p}\Delta\beta_i + (p-2q)\beta_0]} m_{p,q}(g_1, g_2, \ldots, g_L) + E_{p,q}$$

Where p=L, and $$m_{p,q}(g_i) = \sum_{n=1}^{N} g_i(n)^{p-q}[g_i(n)^*]^q, \quad (7)$$

and $E_{p,q}$ is a negligible number with uncorrelated terms. The cumulants can be calculated by a combination of moments using the Moment-Cumulant Formula and the cyclic-moments and cyclic-cumulants can be also obtained using the moments. Therefore, the moments expression in EQ. (6) and EQ. (7) can be extended to cumulants, cyclic-moments, and cyclic-cumulants for distributed signal copies. Since the uncorrelated noises in distributed signal editions are eliminated in the moment calculation, the use of the cumulants may not give the better performance in classifying the modulation schemes and therefore moments alone can be used, cumulants alone may be used, as well as use of moments and cumulants.

The linear digital modulation feature for moment is defined as $$\Omega_{p,q}(x_1, x_2, \ldots, x_L) = \quad (8)$$

$$\left|\frac{m_{p,q}(x_1, x_2, \ldots, x_L)}{m_{p,q/2}(x_1, x_2, \ldots, x_L)}\right| \approx \left|\frac{m_{p,q}(g_1, g_2, \ldots, g_L)}{m_{p,q/2}(g_1, g_2, \ldots, g_L)}\right|$$

which is compared to the reference moments $$\Omega_{p,q}(z_i) = \left|\frac{m_{p,q}(z_i)}{m_{p,q/2}(z_i)}\right| \quad (9)$$

where $z_i$ is a vector of M constellation alphabets associated to the $l^{th}$ M-ary modulation scheme, and i=1, 2, . . . I. A feature vector V, for example V=[$m_{2,0}$, $m_{4,0}$, $m_{6,0}$, $m_{8,0}$, $m_{10,0}$, $m_{12,0}$, $m_{14,0}$, $m_{16,0}$, $m_{18,0}$, $m_{20,0}$], can be formed with different order of moments and the distance d(x,j) between the vectors $V_x$ associated to the unknown SOI and the feature vector $V_j$ associated to the $j^{th}$ modulation candidate can be calculated by using the weighted root-mean-square method. An unknown SOI x can be classified from I hypothetical modulation candidates by minimizing d(x,j), That is $$\iota = \arg\min_{j=1,2,\ldots,I} d(x, j) \text{ and } d(x, l) < \varepsilon_l, \quad (10)$$

where $\epsilon_l$ is a classification threshold associated to $H_l$.

The same classification method can be applied to other features including cumulants, cyclic-moments, and cyclic-cumulants.

Figure 2:
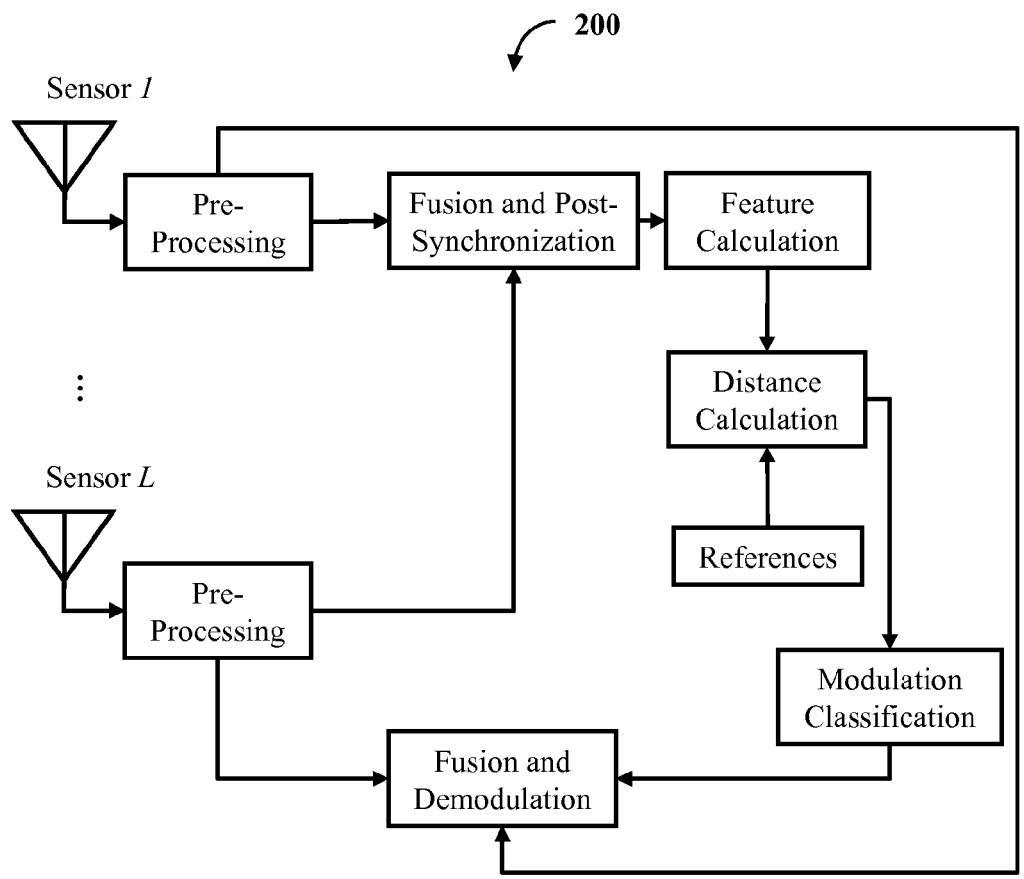
FIG. 2 illustrates one embodiment of a system that can be used in practicing of aspects disclosed herein.

FIG. 2 illustrates one embodiment of a system 200 that can be used in practicing of aspects disclosed herein. The SOI intercepted by the distributed sensors can be pre-processed and send to the fusion center for post-synchronization. The pre-processing can include, but may not necessarily be not limited to, frequency down-conedition, filtering, sampling, and digitization. The post synchronization estimates and removes the RFO and RTO. Then, HOS features, such as moments, can be calculated for distributed signal copies. Those HOS features can be compared with their references in order to obtain a best matched modulation scheme among all reference candidates in the database. Modulation classification is a statistical process for estimating the modulation scheme of an unknown signal based on multiple matching templates. Modulation estimation usually includes the modulation feature extraction, statistical feature processing or transformation, and decision making based on the templates of chosen modulation schemes. Confidence measurements are used to rate the estimation results and control the quality of the modulation recognition decision. With high-confidence estimation, the decision of the modulation scheme will be reported as "estimated", and with low-confidence estimation, the decision of the modulation scheme will be reported as "unknown." If the objective is to classify the unknown modulation, the process is completed here.

The selected modulation scheme can be used to demodulate the SOI if desired. The M pre-processed signal copies are fused to one demodulated signal. Various existing fusion methods can be used. The signals can either be fused in the front and then demodulated or be demodulated separately first and then fused together. The advantage to use the distributed signal copies for calculating HOS features is that the additive noises at the distributed sensors are uncorrelated which are eliminated in the HOS calculation. The choice of the type and order of HOS is based on the applications and the implementation of the HOS is flexible.

Figure 3:
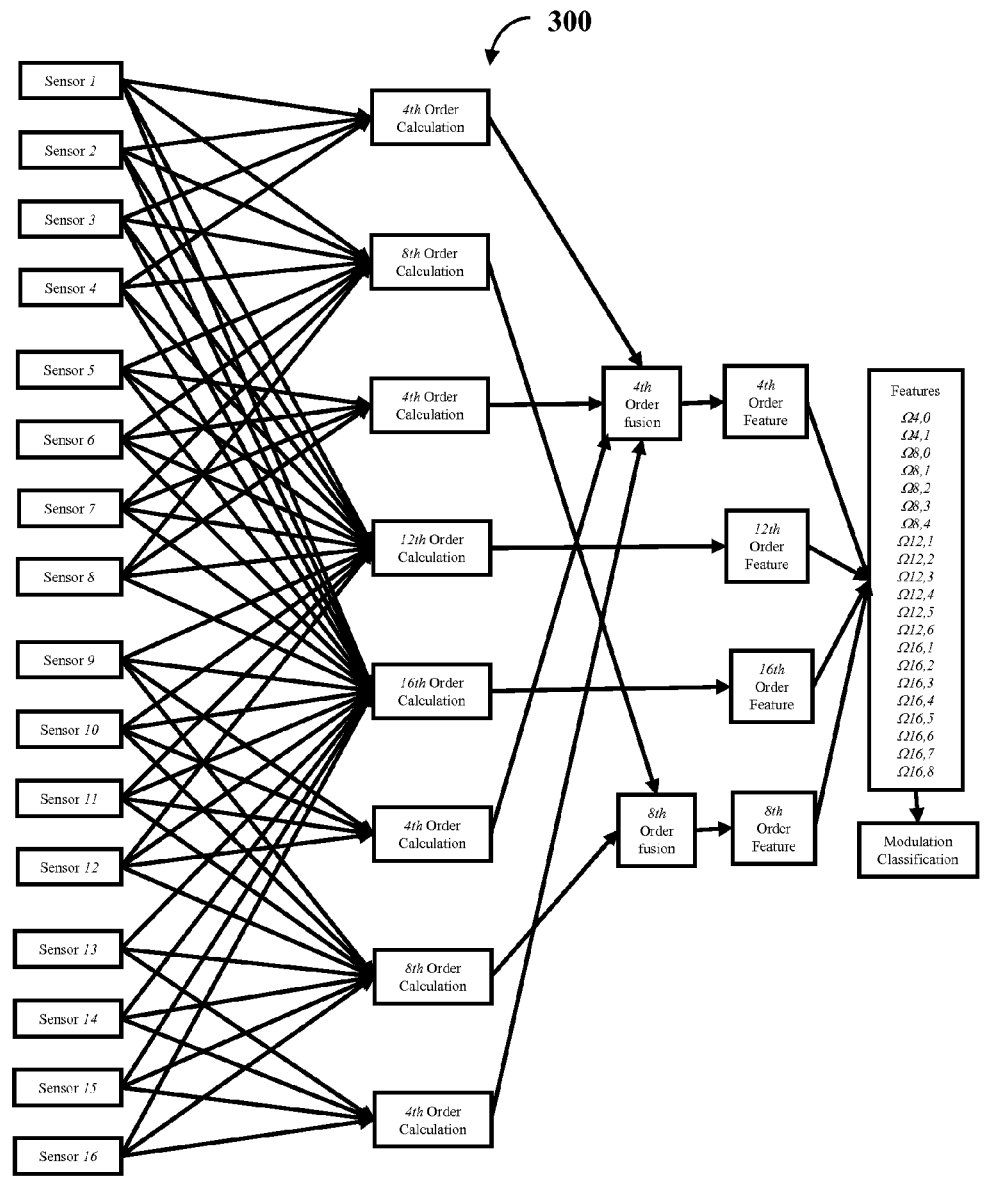
FIG. 3 illustrates one embodiment of a system with sixteen distributed sensors.

FIG. 3 illustrates one embodiment of a system 300 with sixteen distributed sensors. The sixteen distributed sensors can be used in generating moments: $\Omega_{4,0}$, $\Omega_{4,1}$, $\Omega_{8,0}$, $\Omega_{8,1}$, $\Omega_{8,2}$, $\Omega_{8,3}$, $\Omega_{8,4}$, $\Omega_{12,1}$, $\Omega_{12,2}$, $\Omega_{12,3}$, $\Omega_{12,4}$, $\Omega_{12,5}$, $\Omega_{12,6}$, $\Omega_{16,1}$, $\Omega_{16,2}$, $\Omega_{16,3}$, $\Omega_{16,4}$, $\Omega_{16,5}$, $\Omega_{16,6}$, $\Omega_{16,7}$, and $\Omega_{16,8}$. The sixteen sensors can be partitioned to four groups and each group performs the $4^{th}$ order moments calculation. These moments obtained from four groups are fused to yield the more accurate results. Also, the sensors can be partitioned to two groups to performs the $8^{th}$ order moments calculations and then fused together. As an example, a vector $V=[\Omega_{4,0}\Omega_{4,1}\Omega_{8,0}\Omega_{1,2}\Omega_{1,6}]$ can be chosen for classifying most of linear digital modulation schemes including ASK2, 4, 8, PSK2, 4, 8, 16, squared QAM16,64,256, rectangular QAM8, cross QAM32, V.29 QAM8, 16, and MIL-STD-188 circular-squared QAM16, 32, 64.

Figure 4:
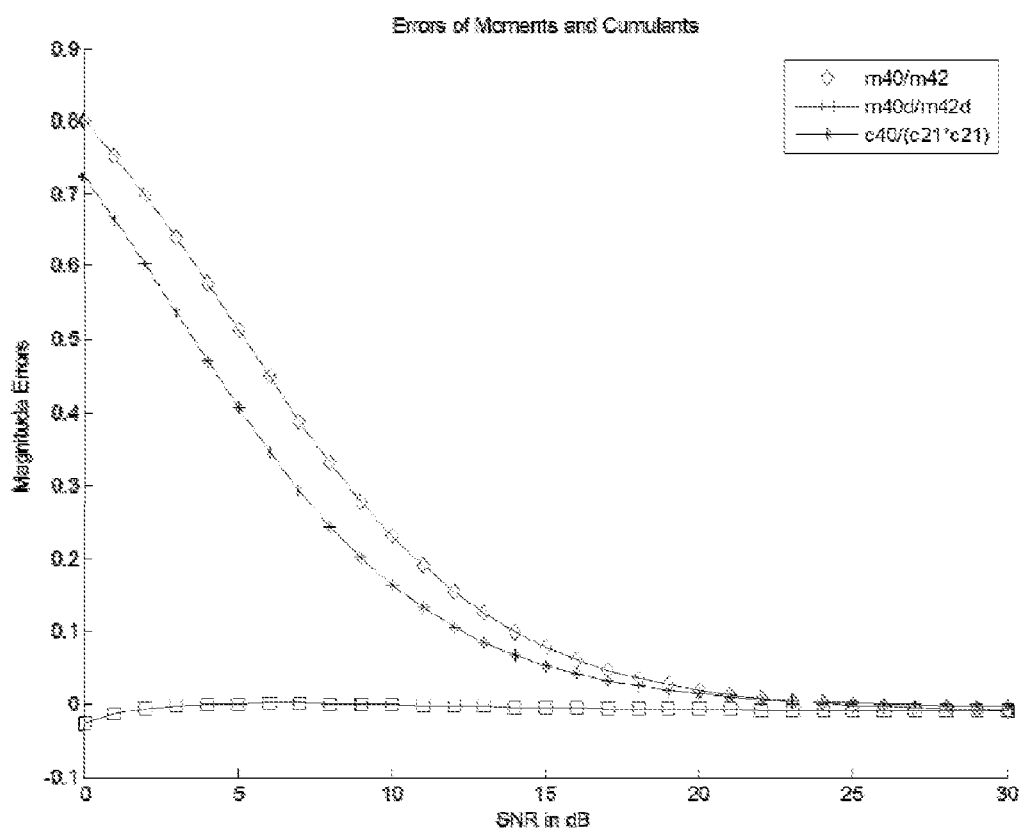
FIG. 4 illustrates one embodiment of a chart that illustrates a potential result of practicing aspects disclosed herein.

FIG. 4 illustrates one embodiment of a chart 400 that illustrates a potential result of practicing aspects disclosed herein. A 16-ary square QAM signal can be generated with a sample per symbol. The signal symbol can be generated by random integers. Signal to noise ratio (SNR) is the average symbol power over average noise sample power in dB and shows that if the noise power is unknown, using moment $|m_{4,0}/m_{4,2}|$, plotted by diamonds, and the cumulant $|c_{4,0}/(c_{2,1}c_{2,1})|$, plotted by starts, yield significant errors when SNR<20 dB, but the new method using $\Omega_{4,0}$, plotted by squares, is very robust to the variation of SNR. The error is calculated by the difference between the moment of a noisy signal and the moment of the noiseless signal constellation alphabets. Since $\Omega_{4,0}$ maintains a relatively flat curve from the low SNR to the high SNR, it is insensitive to the noise and is a very reliable modulation feature.

A plurality of sensors can be deployed in an environment. These sensors can be used to capture the SOI. However, when the signal is weak or difficult to sense, what an individual sensor captures may be of little value. Therefore, multiple sensors can be used together to capture the signal (e.g., different editions of the SOI). Further, it is possible that the demodulation scheme of the signal is not known, such as when the signal is from an unknown network (e.g., a network of an enemy). A mathematical operation can be performed upon signal editions such that a result does not include noise. This result can be used in determining the demodulation scheme of the signal.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

Figure 5:
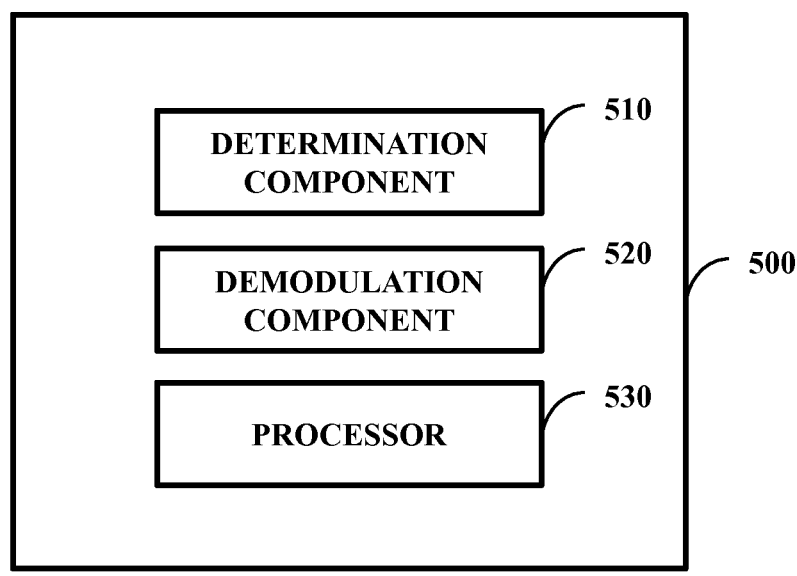
FIG. 5 illustrates one embodiment of a system comprising a determination component, a demodulation component, and a processor.

FIG. 5 illustrates one embodiment of a system 500 comprising a determination component 510, a demodulation component 520, and a processor 530. The determination component 510 makes a determination on a modulation scheme of a signal based, at least in part, on a mathematical result derived from performance of a mathematical operation upon the signal. The signal is obtained from a first receiver and a second receiver and performance of the mathematical operation produces the mathematical result such that the mathematical result is void of noise. The demodulation component 520 demodulates the signal through use of the modulation scheme, where the signal after demodulation is outputted. The processor 530 executes at least one instruction associated with the determination component 510 or the demodulation component 520 (e.g., the determination component 510, the determination component and the demodulation component, etc.).

In one embodiment, the mathematical operation comprises summation of a product from multiplication of the first edition of the signal with the second edition of the signal. In one embodiment, this can include calculating a moment thorough use of the first edition of the signal and a second edition of the signal (e.g., to produce a second-order moment).

Figure 6:
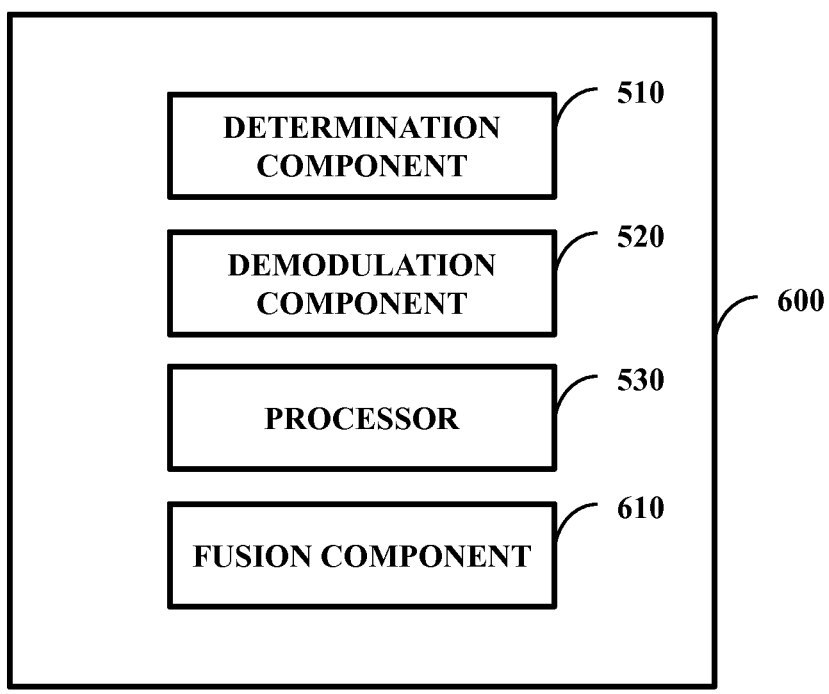
FIG. 6 illustrates one embodiment of a system comprising the determination component, the demodulation component, the processor, and the fusion component.

FIG. 6 illustrates one embodiment of a system 600 comprising the determination component 510, the demodulation component 520, the processor 530, and the fusion component 610. The fusion component 610 fuses a first edition of the signal and a second edition of the signal together to form the signal that is demodulated, where the first edition of the signal is obtained from the first receiver and the second edition of the signal is obtained from the second receiver and where the first receiver and the second receiver are different receivers.

In one embodiment, the first edition of the signal is an edition of the signal with a first noise and the second edition of the signal is an edition of the signal with a second noise. A component can produce the mathematical result such that the first noise and second noise are not represented in the mathematical result. The first edition of the signal and the second edition of the signal can be fused into the signal and then be demodulated or the first edition and second edition can be individually demodulated and then fused into the signal.

The sensor 1 of FIG. 1 can receive the first edition of the signal while the sensor 2 of FIG. 1 can receive the second edition of the signal. These signal editions can be fused together into a common signal upon which the mathematical operation is performed. In one embodiment, the fusion component 610 (e.g., that includes the fusion center) can fuse the signal editions together after the mathematical operation is performed on the signal editions. Therefore, fusion can occur at various times, such as before the modulation scheme is determined or after.

Figure 7:
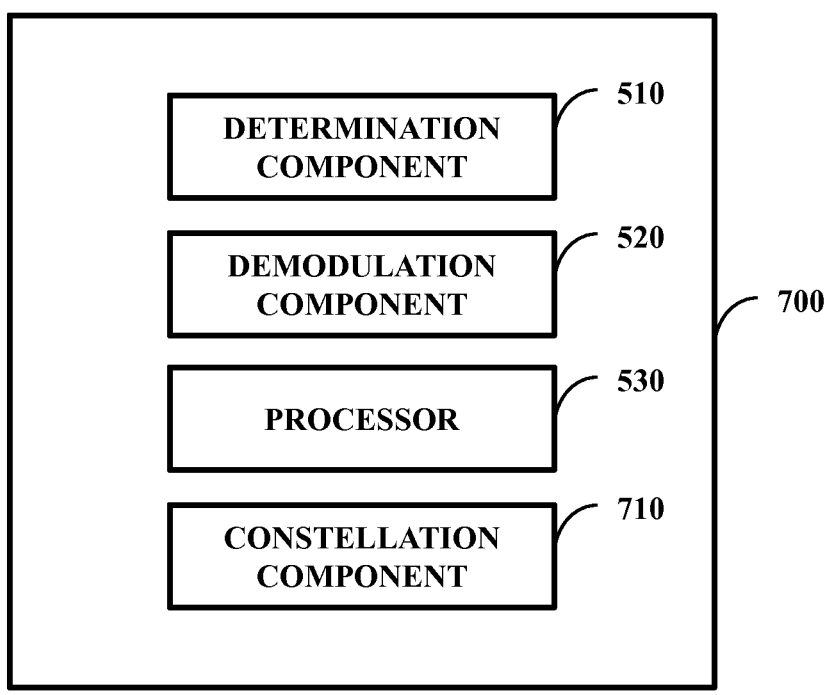
FIG. 7 illustrates one embodiment of a system comprising the determination component, the demodulation component, the processor, and a constellation component.

FIG. 7 illustrates one embodiment of a system 700 comprising the determination component 510, the demodulation component 520, the processor 530, and a constellation component 710. The constellation component 710 makes an identification of a constellation of the signal. The constellation of the signal is used to make the determination of the modulation scheme of the signal. In one example, the constellation component 710 can evaluate the signal and determine that the signal has a constellation of squared QAM16.

Figure 8:
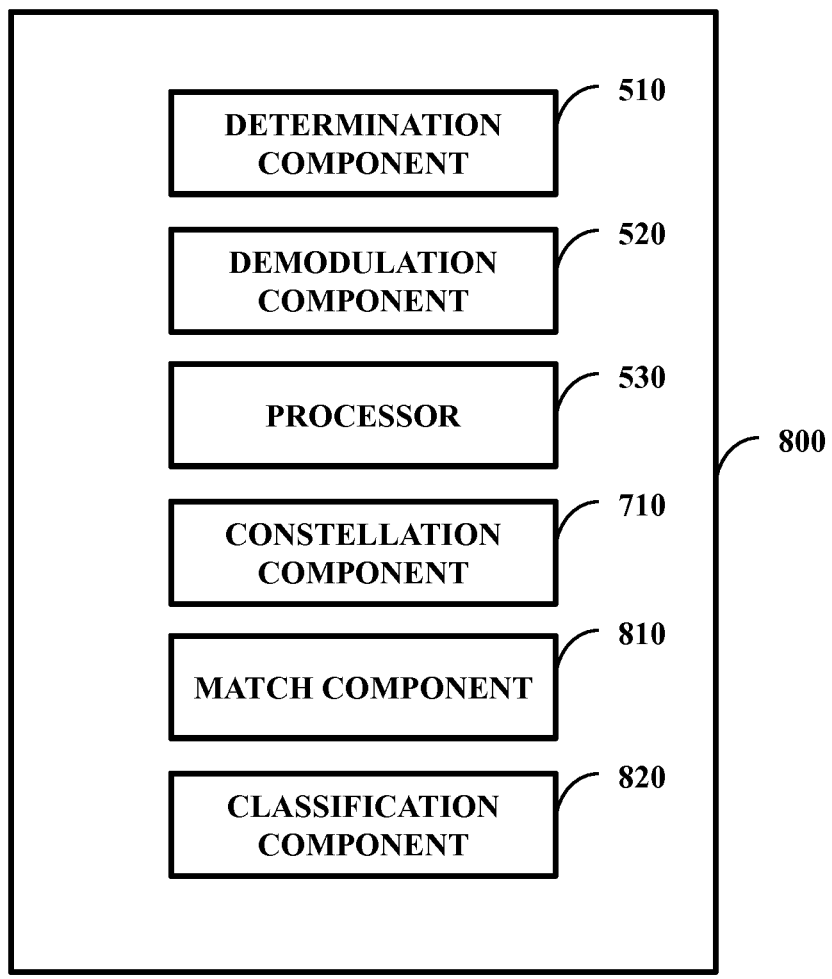
FIG. 8 illustrates one embodiment of a system comprising the determination component, the demodulation component, the processor, the constellation component, a match component, and a classification component.

FIG. 8 illustrates one embodiment of a system 800 comprising the determination component 510, the demodulation component 520, the processor 530, the constellation component 710, a match component 810, and a classification component 820. The match component 810 makes a match of a constellation of the signal with a constellation of a known signal. The classification component 820 selects a classification for the signal based, at least in part, on the constellation of the known signal. The classification is used to make the determination on the modulation scheme of the signal.

When the signal editions are received by the receivers, the signal editions can be noisy and thus difficult to use. The mathematical operation can be performed on the signal editions (e.g., before fusion together or after fusion together). The mathematical operation can function such that a result is without noise. In one example, when the mathematical operation comprises summation of a product from multiplication of the first edition of the signal with the second edition of the signal noise is removed from the result of the operation since noise is random and thus commonly is not repeated.

In one embodiment, the constellation component 710 determines a constellation of the signal, such as cross QAM32. A database can be accessed that retains records of known signals as well as constellations of those known signals. The match component 810 can access the database and compare the constellation of the signal against constellations of the known signals. A constellation of a known signal with a highest match to the constellation of the signal can be designated as the matching signal. In the example with cross QAM32, the database can include a known signal that has a constellation of cross QAM32. The classification component 820 identifies a classification of the matching signal and applies that classification to the signal (e.g., the classification corresponds to a modulation scheme—a signal classified as cross QAM32 has a modulation scheme of ×32). The determination component 510 can determine a demodulation scheme associated with signals of that classification and in turn select the demodulation scheme for the signal. The demodulation component 510 can then demodulate the signal and output the signal after demodulation.

Figure 9:
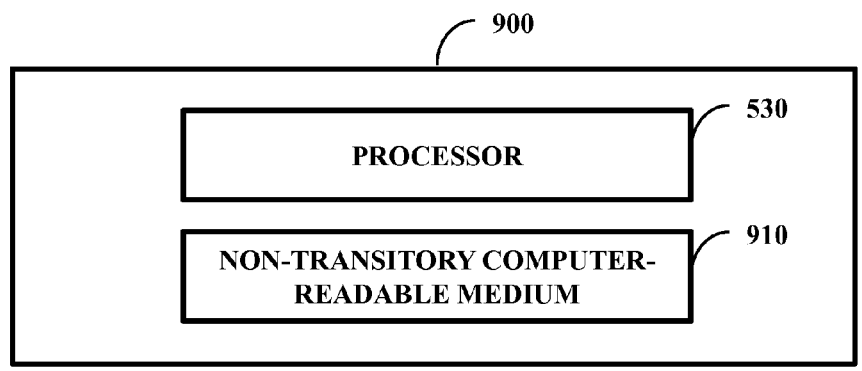
FIG. 9 illustrates one embodiment of a system that comprises the processor and a non-transitory computer-readable medium.

FIG. 9 illustrates one embodiment of a system 900 that comprises the processor 530 and a non-transitory computer-readable medium 910. In one embodiment, the non-transitory computer-readable medium 910 is communicatively coupled to the processor 530 and stores computer executable instructions to facilitate operation of components. In one embodiment, the non-transitory computer-readable medium 910 is configured to store computer-executable instructions that when executed by the processor 530 cause the processor 530 to perform a method.

Figure 10:
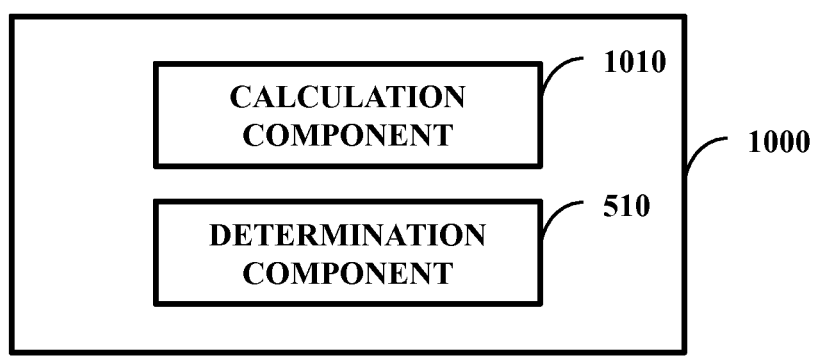
FIG. 10 illustrates one embodiment of a system comprising a calculation component and the determination component.

FIG. 10 illustrates one embodiment of a system 1000 comprising a calculation component 1010 and the determination component 510. The calculation component 1010 is configured to perform a mathematical operation upon a first signal edition and a second signal edition to produce a mathematical result, where performance of the mathematical operation eliminates uncorrelated noise of the first signal edition and the second signal edition through correlation of the first signal edition and the second signal edition. The first signal edition and the second signal edition are different editions of a signal. The first signal edition is collected by a first sensor while the second signal edition is collected by a second sensor. The first sensor and second sensor are different sensors (e.g., different physical sensors, different sensor types, non-identical sensors, etc.). The determination component 510 is configured to make a determination on a modulation scheme for the signal based, at least in part, on the mathematical result, where the modulation scheme is employed to demodulate the signal. In one embodiment, the mathematical operation comprises calculation of a moment of the first signal edition and calculation of a moment of the second signal edition. In one embodiment, an individual signal edition (e.g., signal snapshot) is a signal intercepted by a sensor. Two different signal editions may not be identical due to various reasons, such as due to the channel diversity, heterogeneous devices, and additive noises.

Figure 11:
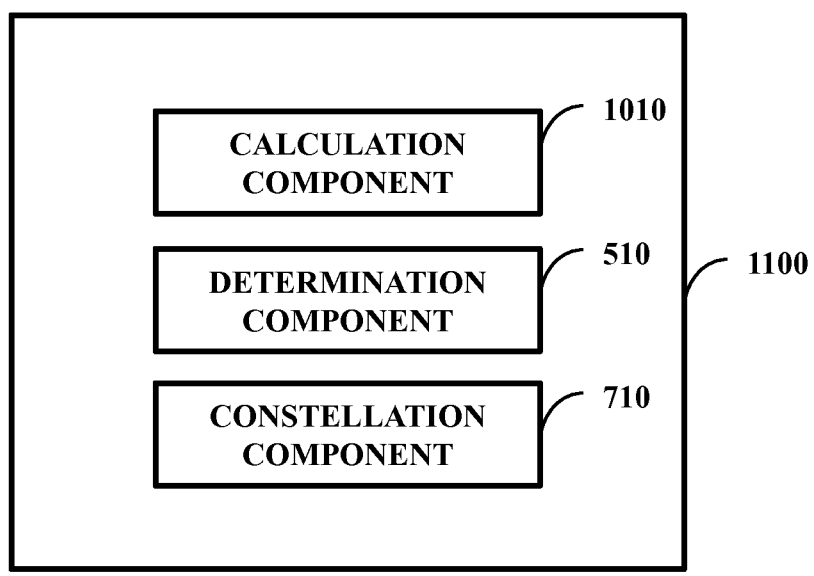
FIG. 11 illustrates one embodiment of a system comprising the calculation component, the determination component, and the constellation component.

FIG. 11 illustrates one embodiment of a system 1100 comprising the calculation component 1010, the determination component 510, and the constellation component 710. The constellation component 710 is configured to make an identification of a constellation of the signal. The constellation of the signal is used to make the determination of the modulation scheme of the signal.

Figure 12:
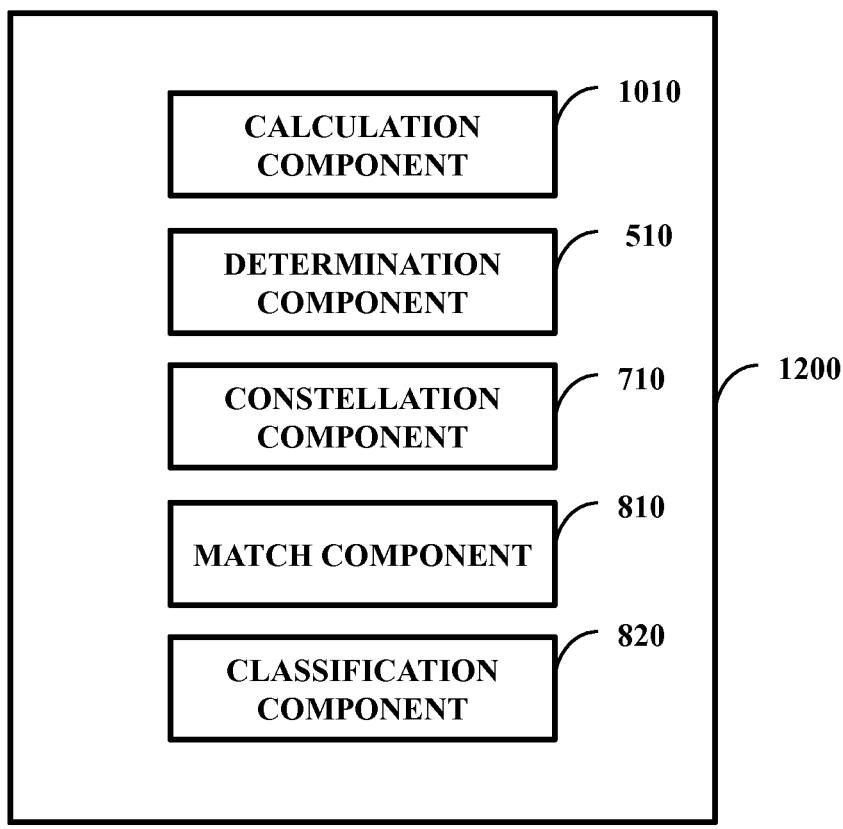
FIG. 12 illustrates one embodiment of a system comprising the calculation component, the determination component, the constellation component, the match component, and the classification component.

FIG. 12 illustrates one embodiment of a system 1200 comprising the calculation component 1010, the determination component 510, the constellation component 710, the match component 810, and the classification component 820. The match component 810 is configured to make a match of the signal with a known signal. The classification component 820 is configured to select a classification for the signal based, at least in part, on the known signal. The classification is used to make the determination on the modulation scheme for the signal.

Figure 13:
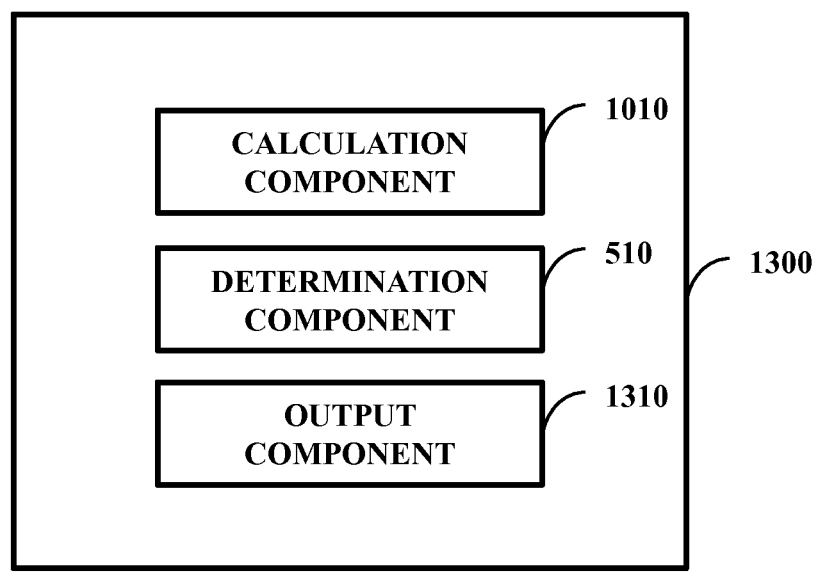
FIG. 13 illustrates one embodiment of a system comprising the calculation component, the determination component, and a demodulation component.

FIG. 13 illustrates one embodiment of a system 1300 comprising the calculation component 1010, the determination component 510, and an output component 1310. The output component 1310 is configured to cause the signal to be outputted after the signal is demodulated through employment of the demodulation scheme.

Figure 14:
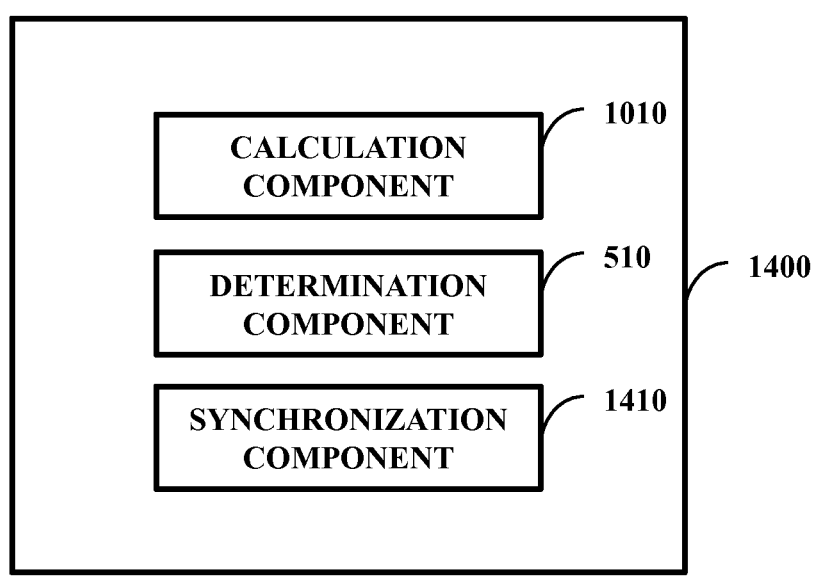
FIG. 14 illustrates one embodiment of a system comprising the calculation component, the determination component, and a synchronization component.

FIG. 14 illustrates one embodiment of a system 1400 comprising the calculation component 1010, the determination component 510, and a synchronization component 1410. The synchronization component 1410 is configured to synchronize the first signal edition with the second signal edition, where the calculation component 1010 performs the mathematical operation upon the first signal edition and the second signal edition to produce the mathematical result after the first signal edition is synchronized with the second signal edition.

In one embodiment, the synchronization component 1410 comprises a find component configured to find an alignment point between the first signal edition and the second signal edition. The synchronization component 1410 can also comprise an alignment component configured to use the alignment point to align the first signal edition and the second signal edition, where the alignment point is a point of greatest alignment between the first signal edition and the second signal edition. Alignment of the first signal edition and the second signal edition can be considered synchronization. While discussed as being part of the synchronization component 1410, the find component and the alignment component can configure to not be part of the synchronization component 1410.

In one embodiment, a first Fourier transform is applied to the first signal edition to produce a first transform result and a second Fourier transform (that may or may not be the same as the first Fourier transform) is applied to the second signal edition to produce a second transform result. The magnitudes of the first transform result and second transform result are used by the find component to find the alignment point.

In one embodiment, the synchronization component 1410 removes a phase offset from the first signal edition and a phase offset from the second signal edition. The synchronization component 1410 can also determine a magnitude of the first signal edition after the phase offset is removed and a magnitude of the second signal edition after the phase offset is removed. Further, the synchronization component 1410 determines a correlation between the first signal edition and the second signal edition through use of the magnitude of the first signal edition and the magnitude of the second signal edition, where the correlation is used to find the alignment point.

Figure 15:
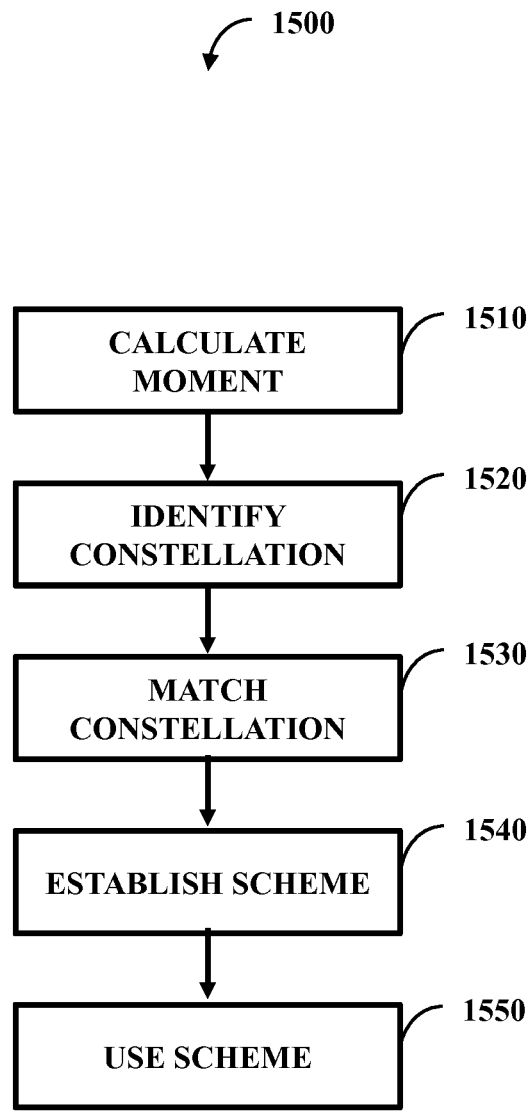
FIG. 15 illustrates one embodiment of a method with various actions.

FIG. 15 illustrates one embodiment of a method 1500 with various actions. At 1510, calculating a moment for a first signal edition and a second signal edition occurs. The moment is calculated through use of a product from multiplying at least a first edition of a signal with a second edition of the signal. The first edition of the signal is collected by a first sensor. The second edition of the signal is collected by a second sensor. The first sensor and the second sensor are different sensors. The first edition of the signal and the second edition of the signal are non-identical (e.g., are the same signal, but with different noise, different offsets, different strength, etc.) when collected. At 1520 there is identifying a constellation of the signal through use of the moment. At 1530 there is matching the constellation of the signal with a constellation of a known signal. At 1540 establishing a modulation scheme associated with the known signal occurs. At 1550 there is using the modulation scheme associated with the known signal to demodulate the signal.

Figure 16:
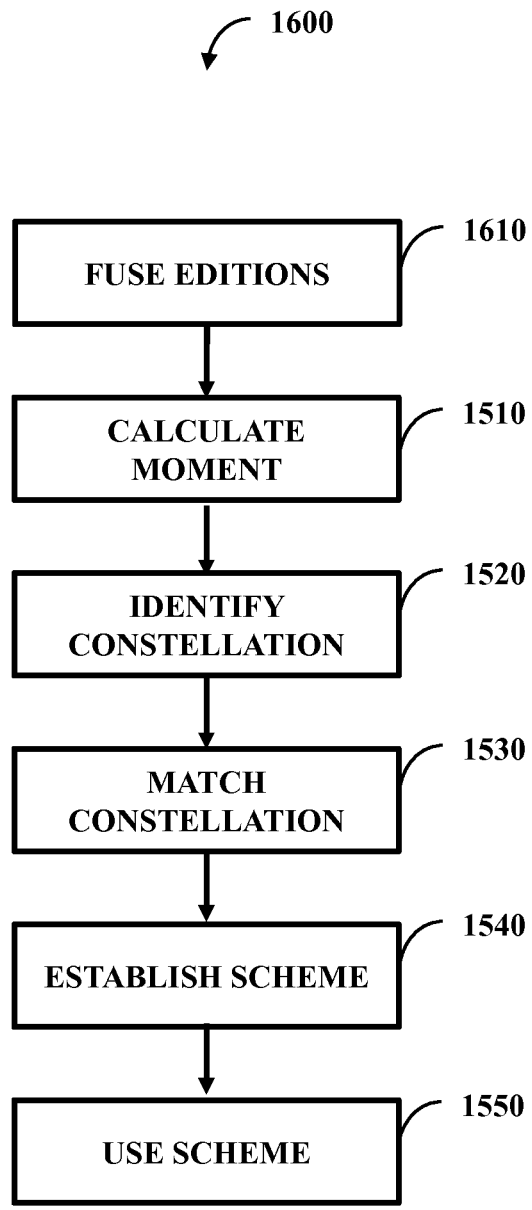
FIG. 16 illustrates one embodiment of a method with edition fusion along with other actions.

FIG. 16 illustrates one embodiment of a method 1600 with edition fusion along with other actions 1510-1550. At 1610, fusing the first signal edition and the second signal edition together occurs. In one embodiment, using the modulation scheme associated with the known signal to demodulate the signal comprises using the modulation scheme associated with the known signal to demodulate the first signal edition and using the modulation scheme associated with the known signal to demodulate the second signal edition, where fusion occurs after demodulation of the first signal edition and the second signal edition.

Figure 17:
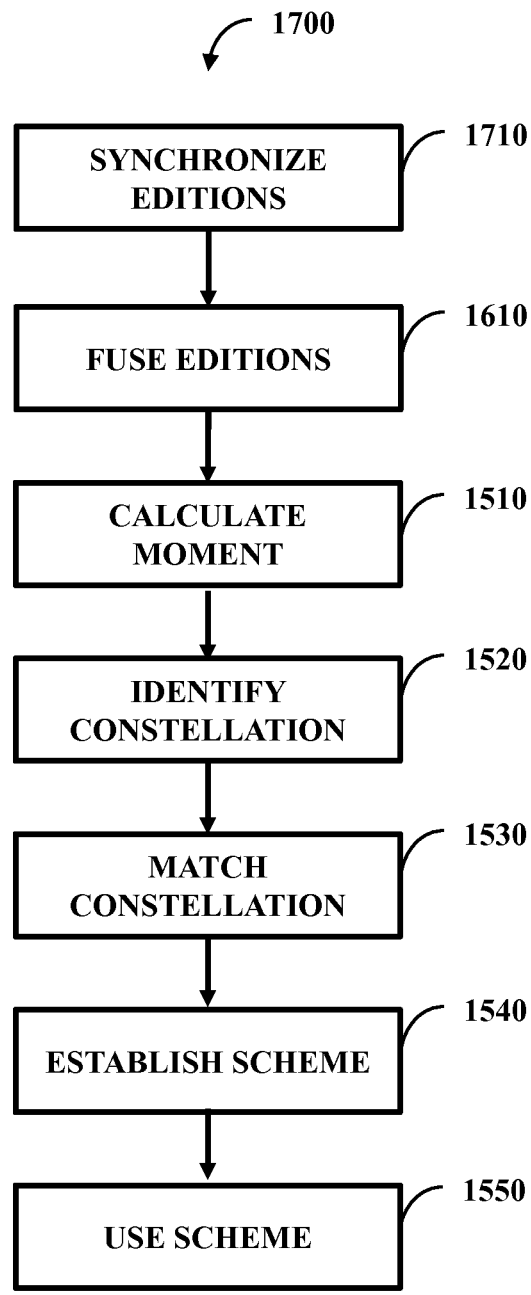
FIG. 17 illustrates one embodiment of a method with edition synchronization along with other actions.

FIG. 17 illustrates one embodiment of a method 1700 with edition synchronization and other actions 1510-1550 and 1610. At 1710 there is synchronizing the first signal edition with the second signal edition, where fusion of the first signal edition together with the second signal edition occurs after synchronization.

Figure 18:
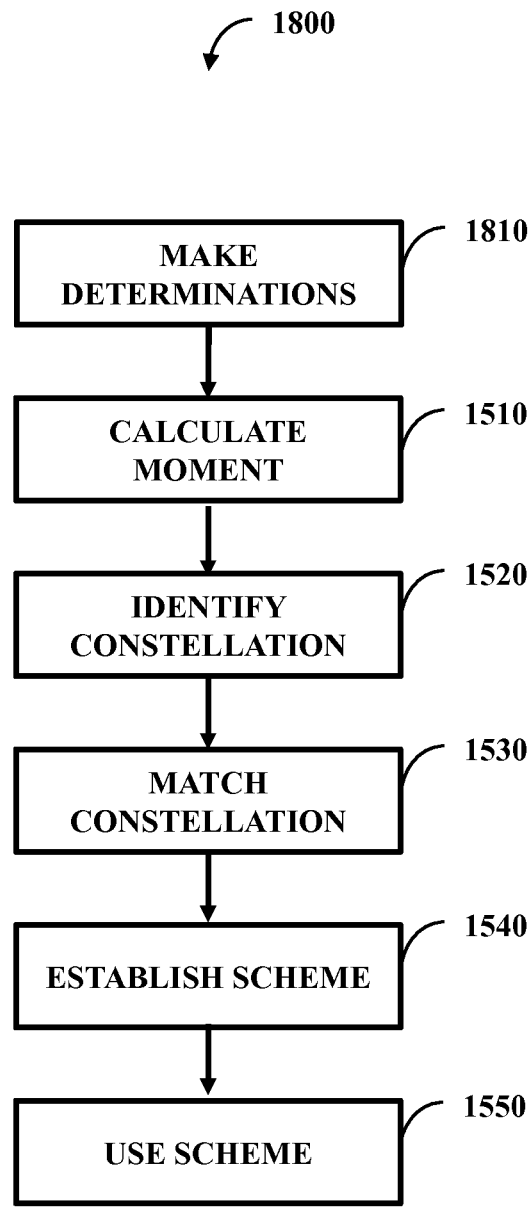
FIG. 18 illustrates one embodiment of a method with determination making along with other actions.

FIG. 18 illustrates one embodiment of a method 1800 with determination making and other actions 1510-1550. At 1810, making a first edition determination on if the first signal edition is outlying (e.g., not consistent with other signal editions of the signal) takes place along with making a second edition determination on if the second signal edition is outlying. In one embodiment, calculating the moment occurs when the first edition determination is that the first signal edition is not outlying and when the second edition determination is that the second signal edition is not outlying.

In one embodiment, making the first edition determination on if the first edition of the signal is outlying comprises determining if a signal to noise ratio of the first signal edition meets a threshold value (e.g., does not reach the threshold value, does not exceed a threshold value, surpasses a threshold value, etc.), where if the signal to noise ratio of the first signal edition meets the threshold value, then the first signal edition is outlying. Further, making the second edition determination on if the second edition of the signal is outlying can comprise determining if a signal to noise ratio of the second signal edition is below the threshold value, where if the signal to noise ratio of the second signal edition is below the threshold value, then the second signal edition is outlying.

Figure 19:
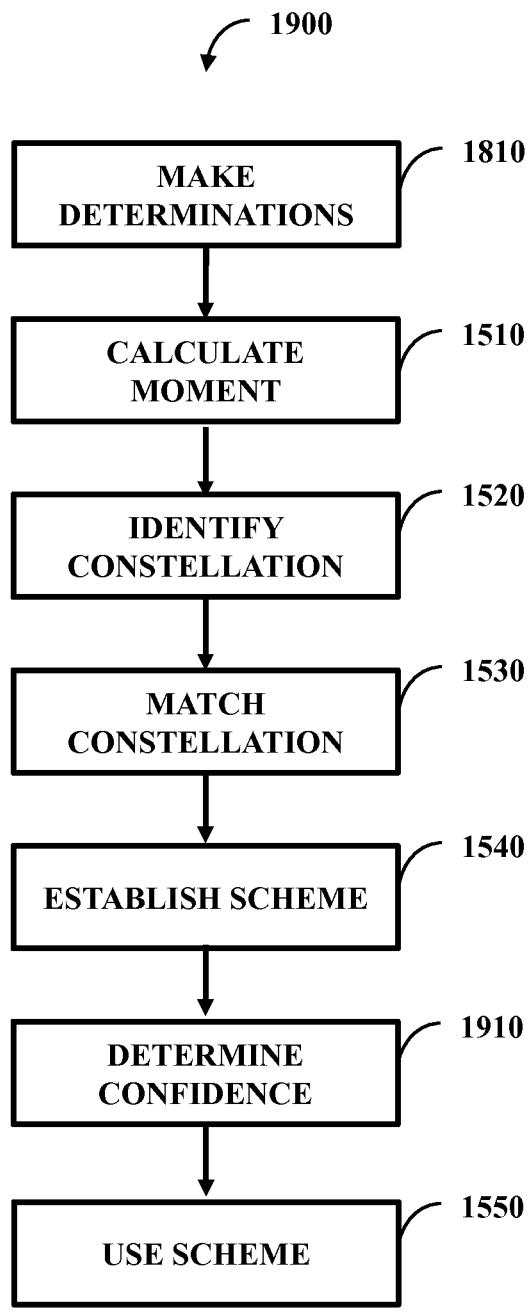
FIG. 19 illustrates one embodiment of a method with confidence determination along with other actions.

FIG. 19 illustrates one embodiment of a method 1900 with confidence determination and other actions. At 1910 there is determining a confidence level of the modulation scheme (e.g., likelihood of correctness of the modulation scheme being the correct scheme to be used in demodulation of the signal). In one embodiment, using the modulation scheme associated with the known signal to demodulate the signal occurs in response to the confidence level meeting a threshold level (e.g., reaching the threshold level, surpassing the threshold level, not surpassing the threshold level, etc.).

What is claimed is:

1. A system, comprising:
a calculation component configured to perform a mathematical operation upon a first signal edition and a second signal edition to produce a mathematical result, where performance of the mathematical operation eliminates uncorrelated noise of the first signal edition and the second signal edition through correlation of the first signal edition and the second signal edition, where the first signal edition and the second signal edition are different editions of a signal, where the first signal edition is collected by a first sensor, where the second signal edition is collected by a second sensor, and where the first sensor and second sensor are different sensors;
a determination component configured to make a determination on a modulation scheme for the signal based, at least in part, on the mathematical result, where the modulation scheme is employed to demodulate the signal;
a synchronization component configured to synchronize the first signal edition with the second signal edition, where the calculation component performs the mathematical operation upon the first signal edition and the second signal edition to produce the mathematical result after the first signal edition is synchronized with the second signal edition; and
a non-transitory computer-readable medium configured to retain at least one instruction associated with the calculation component, the determination component, the synchronization component, or a combination thereof.

2. The system of claim 1, where the signal is outputted after being demodulated with the demodulation scheme.

3. The system of claim 1, the components comprising:
a constellation component configured to make an identification of a constellation of the signal, where the constellation of the signal is used to make the determination of the modulation scheme of the signal.

4. The system of claim 3, the components comprising:
a match component configured to make a match of the signal with a known signal; and
a classification component configured to select a classification for the signal based, at least in part, on the known signal, where the classification is used to make the determination on the modulation scheme for the signal.

5. The system of claim 1, the components comprising:
an output component configured to cause the signal to be outputted after the signal is demodulated through employment of the demodulation scheme.

6. The system of claim 1, where the mathematical operation comprises calculation of a moment through use of the first signal edition and the second signal edition.

7. The system of claim 6, where the moment comprises a summation of a product of multiplying the first signal edition with the second signal edition.

8. The system of claim 1, the synchronization component comprising:
a find component configured to find an alignment point between the first signal edition and the second signal edition; and
an alignment component configured to use the alignment point to align the first signal edition and the second signal edition, where the alignment point is a point of greatest alignment between the first signal edition and the second signal edition, where alignment of the first signal edition and the second signal edition causes synchronization.

9. A non-transitory computer-readable medium configured to store computer-executable instructions that when executed by a processor cause the processor to perform a method, the method comprising:
computing a moment for a first signal edition and a second signal edition, where the moment is computed through use of a product from multiplying at least a first edition of a signal with a second edition of the signal, where the first edition of the signal is collected by a first sensor, where the second edition of the signal is collected by a second sensor, where the first sensor and the second sensor are different sensors, and where the first edition of the signal and the second edition of the signal are non-identical when collected;
identifying a constellation of the signal through use of the moment;
pairing the constellation of the signal with a constellation of a known signal;
identifying a modulation scheme associated with the known signal;
utilizing the modulation scheme associated with the known signal to demodulate the signal; and
fusing the first signal edition and the second signal edition together, where using the modulation scheme associated with the known signal to demodulate the signal comprises using the modulation scheme associated with the known signal to demodulate the first signal edition and using the modulation scheme associated with the known signal to demodulate the second signal edition, where fusion occurs after demodulation of the first signal edition and the second signal edition.

10. The non-transitory computer-readable medium of claim 9, comprising:
synchronizing the first signal edition with the second signal edition, where fusion of the first signal edition together with the second signal edition occurs after synchronization.

11. The system of claim 9, where first sensor and second sensor are non-cooperative with one another.

12. The system of claim 9, where first sensor and second sensor are cooperative with one another.

13. The non-transitory computer-readable medium of claim 9, the method comprising:
calculating a confidence level of the modulation scheme; and
comparing the confidence level with a threshold to produce a comparison result, where the modulation scheme associated with the known signal is used to demodulate the signal when the comparison result is at an acceptable level.

14. The non-transitory computer-readable medium of claim 9, where a housing retains the first sensor and the non-transitory computer-readable medium.

15. The non-transitory computer-readable medium of claim 9,
where a first housing retains the first sensor,
where a second housing retains the second sensor,
where a third housing retains the non-transitory computer-readable medium, and
where the first housing, the second housing, and the third housing are distinct housings from one another.

16. The non-transitory computer-readable medium of claim 9, the method comprising:
collecting the first signal edition as a first time-stamped data packed; and
collecting the second edition as a second time-stamped data packet,
where the moment is computed after collection of the first signal edition and collection of the second signal edition.

17. A non-transitory computer-readable medium configured to store computer-executable instructions that when executed by a processor cause the processor to perform a method, the method comprising:
making a first edition determination on if a first signal edition of a signal is outlying;
making a second edition determination on if a second signal edition of the signal is outlying;
calculating a moment for the first signal edition and the second signal edition when the first edition determination is that the first signal edition is not outlying and when the second edition determination is that the second signal edition is not outlying;
identifying a constellation of the signal through use of the moment;
matching the constellation of the signal with a constellation of a known signal to produce a signal match;
establishing a modulation scheme associated with the known signal through use of the signal match; and
using the modulation scheme associated with the known signal to demodulate the signal,
where the moment is calculated through use of a product from multiplying at least a first edition of a signal with a second edition of the signal,
where the first edition of the signal is collected by a first sensor,
where the second edition of the signal is collected by a second sensor,
where the first sensor and the second sensor are not the same sensor, and
where the first edition of the signal and the second edition of the signal are non-identical when collected.

18. The non-transitory computer-readable medium of claim 17, where making the first edition determination on if the first edition of the signal is outlying comprises determining if a signal to noise ratio of the first signal edition meets a threshold value, where if the signal to noise ratio of the first signal edition meets the threshold value, then the first signal edition is outlying, where making the second edition determination on if the second edition of the signal is outlying comprises determining if a signal to noise ratio of the second signal edition is below the threshold value, where if the signal to noise ratio of the second signal edition is below the threshold value, then the second signal edition is outlying.

19. The non-transitory computer-readable medium of claim 18, the method comprising:
  determining a confidence level of the modulation scheme, where using the modulation scheme associated with the known signal to demodulate the signal occurs in response to the confidence level meeting a threshold level.

20. The non-transitory computer-readable medium of claim 17, the method comprising:
  synchronizing the first signal edition with the second signal edition, where the moment is calculated through use of synchronized versions of the first signal edition and the second signal edition.

\* \* \* \* \*